Aug. 26, 1941.   J. W. KINNUCAN   2,253,977
REDUCTION DRIVE MECHANISM
Filed Sept. 1, 1939   3 Sheets-Sheet 1

INVENTOR.
James W. Kinnucan
BY
ATTORNEY.

Patented Aug. 26, 1941

2,253,977

UNITED STATES PATENT OFFICE 2,253,977

REDUCTION DRIVE MECHANISM

James W. Kinnucan, Detroit, Mich., assignor, by mesne assignments, to Continental Aviation and Engineering Corporation, a corporation of Virginia Application September 1, 1939, Serial No. 293,098

12 Claims. (Cl. 74—303)

My invention relates to engines and more particularly to a reduction gear drive for engines or other similar power plants.

Much difficulty has been experienced in constructing reduction drives that are rugged enough to stand up in the present day high speed and high powered engines as employed today in aircraft. It is essential that these reduction drives by very compact and as light in weight as is possible consistent with sound engineering practice.

After many years of study of this most difficult problem, I have succeeded in constructing a rugged and efficient reduction gear drive that has effectively overcome the difficulties heretofore experienced with reduction drives more particularly incorporated with aircraft engines.

As a further object of my invention I have provided a reduction gear drive capable of adjustment to vary the ultimate reduction between the driving and driven members, and such an adjustment is obtained in my construction without the substitution or replacement of any part thereof.

A further object of my present invention is to insure efficient performance of my improved heavy duty reduction gear drive by providing improved lubricating means that insures proper lubrication of all moving parts of the mechanism.

And a still further object of my present invention is to provide a compact, rugged, light weight reduction gear drive adapted to be embodied in the present day high powered and high speed aeronautical engines which are more particularly designed for long life and for maintenance free service.

Figures 1, 3:
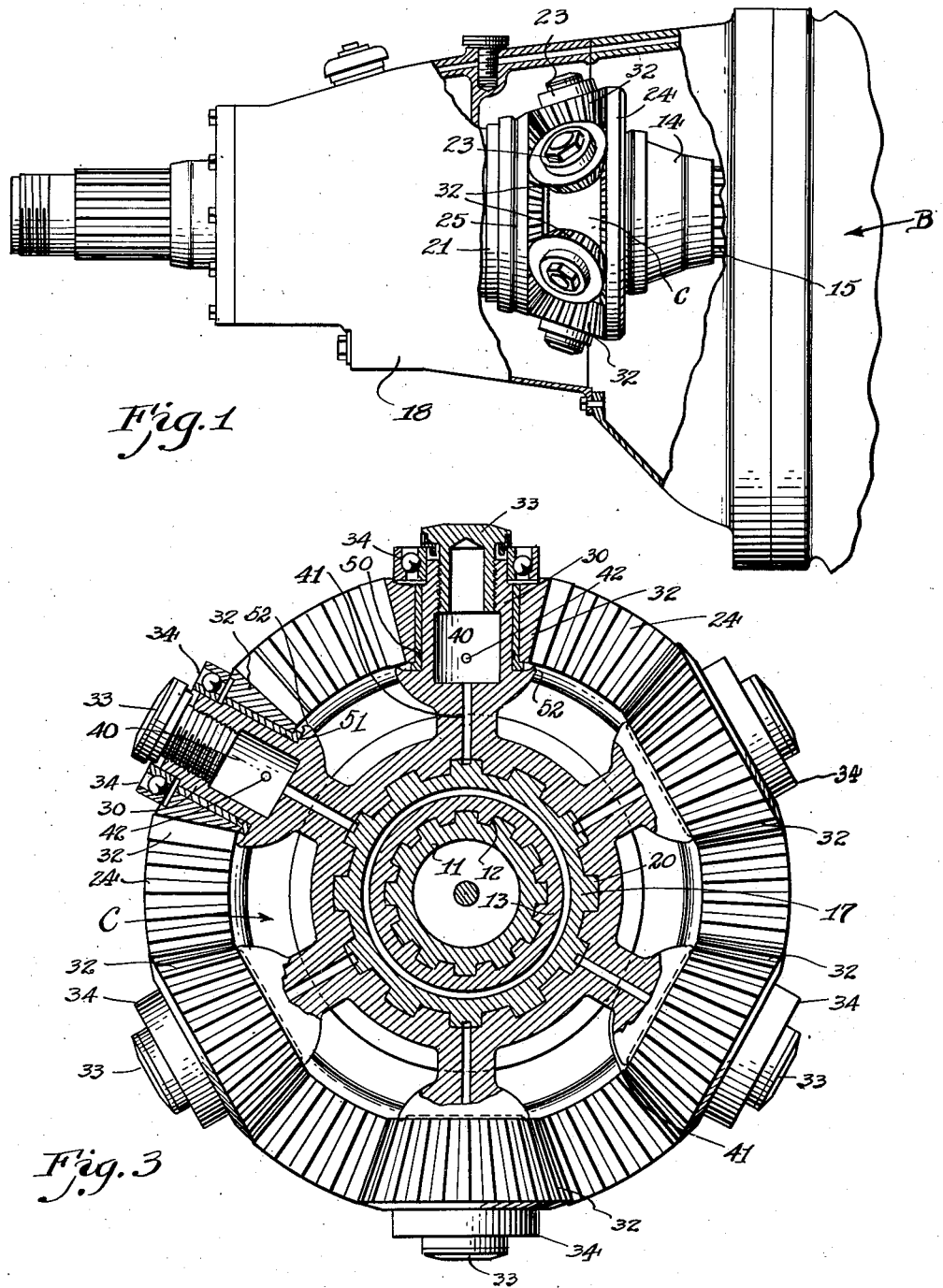
Figure 2:
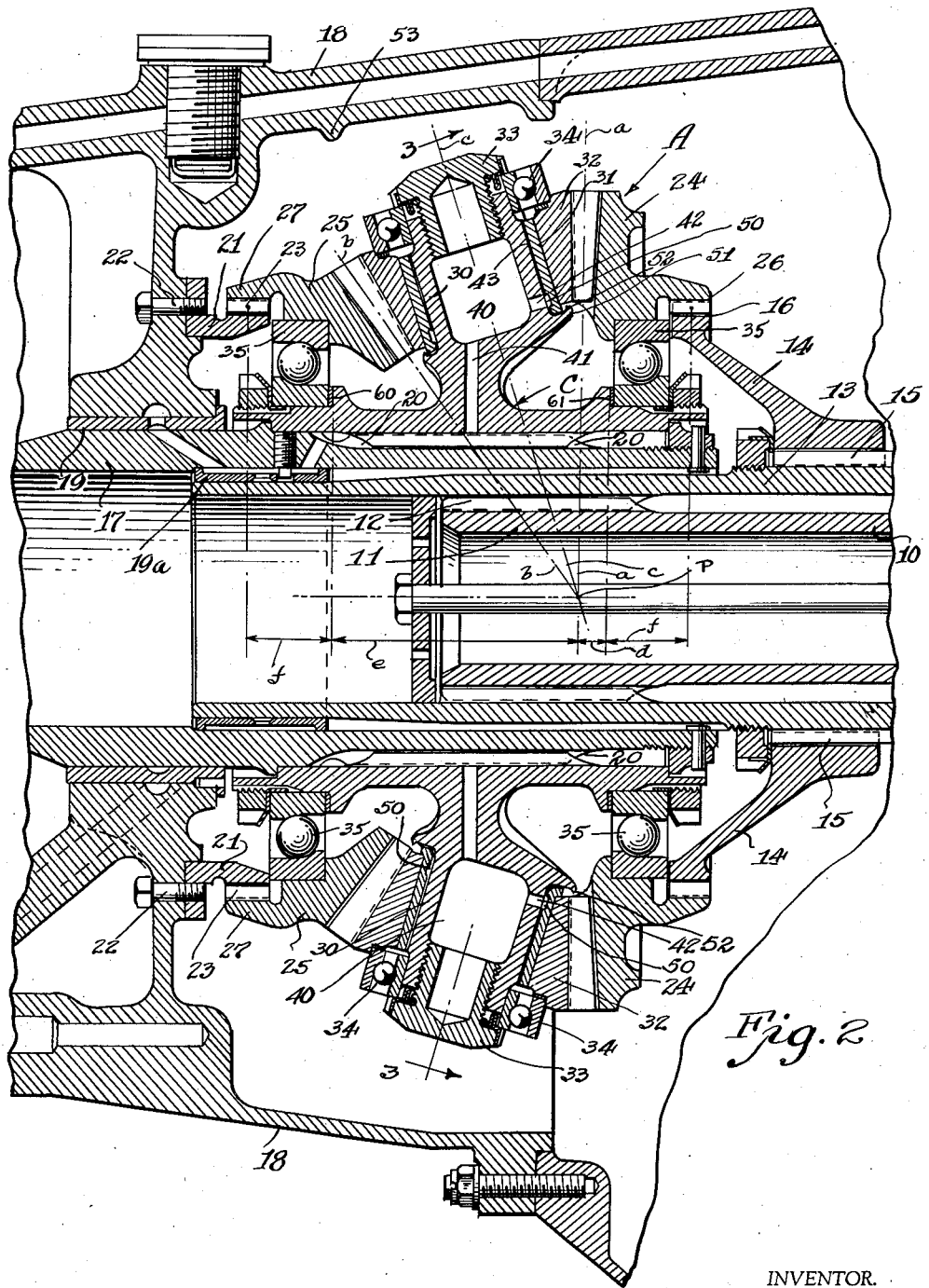
Figure 4:
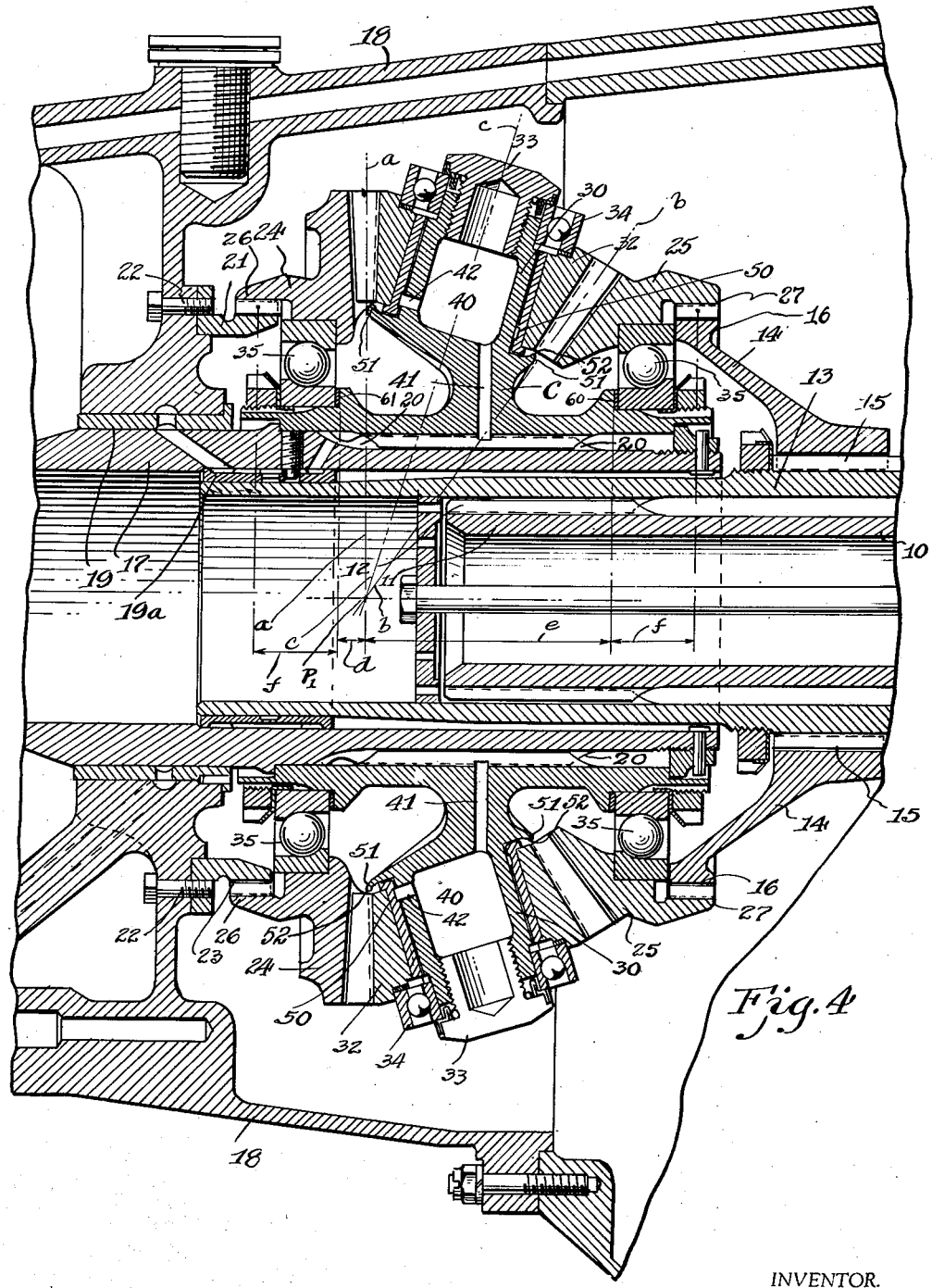

For a more detailed understanding of my invention, reference may be had to the accompanying drawings illustrating a preferred embodiment of my invention in which like characters refer to like parts throughout the several views, and in which:

Fig. 1 is an elevational view of the front end of an aeronautical engine, with a portion thereof being broken away to show my improved reduction gear drive in elevation, Fig. 2 is a longitudinal sectional view of the reduction gear drive and showing the structural relationship of the various cooperating parts of the mechanism, Fig. 3 is a transverse sectional view thereof taken substantially on the line 3—3 of Fig. 2, and Fig. 4 is a longitudinal sectional view similar to Fig. 2, but showing my improved unitary reduction gear drive adjusted for a different speed reduction between the driving and driven members of the engine.

I have selected for purposes of illustration to show my reduction gear drive, designated as a whole by the reference character A, with an internal combustion engine B having a crankshaft 10. The crankshaft is supported in a conventional manner and preferably includes a crankshaft extension 11, which is externally splined as at 12 to drivingly connect with an internally splined shaft or driving sleeve 13. A driving member 14 is splined to the sleeve 13 as at 15 and carries an externally splined portion 16 substantially adjacent the outer periphery thereof.

A driven member 17 is supported by suitable bearings in the nose of the gear case 18 and at its inner end is preferably supported by a bearing 19 carried in the case. Bearing 19a is a bearing or steady rest for sleeve 13. This driven member is externally splined as at 20 to engage complementary internal splines carried by the carrier C. A fixed ring 21 is secured to the gear case as at 22 or by other suitable securing means, and said ring is provided with an externally splined portion 23 of like construction to the externally splined portion 16 carried by the driving member 14. It will be noted that these external splines 23 and 16 are aligned and axially spaced, and are of the same pitch diameter.

My improved and novel reduction gear drive comprises in general the carrier C which is drivingly connected to the driven member 17, a pair of axially spaced and aligned ring gear structures 24 and 25 (see Fig. 2) connected in driving relation with the driving member 14 and fixed ring or support 21 respectively, these ring gears being preferably provided with the internal splines 26 and 27 respectively, which are complementary to the splines 16 and 23. Said splines 26 and 27 are identical and of the same pitch diameter and are constructed and arranged for selective engagement in driving relation with either of said splines 16 and 23.

The carrier C is provided with a plurality of radially extending integral spindles 30 (see Figs. 2, 3 and 4), and the axis of each spindle extends at an angle to a plane extending normal to the carrier axis, the inclination of each spindle being the same in each instance. A bearing sleeve 31 is fitted on each spindle and rotatably supports a beveled idler or intermediate gear 32, said intermediate gears being preferably secured on said spindles by retainer nuts 33 and suitable thrust bearings 34 in a conventional manner.

It will be noted that the ring gears 24 and 25 carry beveled gear teeth and these beveled ring gears are of different pitch diameter, the ring gear 24 being the larger of the two. The angle of these spindles are so designed that all the idler or intermediate gears carried thereby are constantly in mesh with both of said ring gears. Anti-friction bearings 35 are carried by the carrier C for rotatably supporting these ring gears, and it will thus be seen that the carrier, spindles, intermediate and ring gears form a unitary assembly.

In the operation of my reduction gear drive it will be noted the reduction is obtained through the ring gear 24 and idler or intermediate gears 32, which are caused to roll on the fixed gear 25 and thus rotate the carrier C and the driven member 17 drivingly connected with the said carrier.

The driving connection between the carrier C and the driven member 17 is so arranged as to permit an assembly of the unitary reduction gear drive end for end (see Fig. 4) which brings the ring gear 25 into driving relation with the driving member and the ring gear 24 into interlocking engagement with the fixed ring or support 21. The carrier is reversed end for end and likewise the spindles, so that the idler or intermediate gears still remain in mesh with the ring gears. In the particular proportions embodied in this construction, the arrangement illustrated in Fig. 2 provides a reduction from the driving to the driven members of 2.2 to 1 while that illustrated in Fig. 4 provides a reduction of 1.8 to 1. Obviously the proportions may be varied to suit various applications. The adjustment and varying of the reduction drive is had by reason of the symmetrical construction that permits the selective engagement of the driving member 14 with either ring gear.

A further phase of the present construction relates to the lubrication of the idler or intermediate ring gear bearings. The spindle 30 is hollow as shown at 40 and a passage 41 in the carrier C connects this chamber 40 with the main engine lubrication system, and lubricant is fed into the chamber 40 which forms a lubricant reservoir. A lateral passage 42 connects this reservoir with the annular groove 50 connecting with oil passage 43 carried in the sleeve bearing 31. This passage is preferably formed by the normal operating clearance between the sleeve and spindle. The lubricant is induced to travel through the lateral passage 42 and outwardly through the passage 43 by centrifugal forces induced by the rotation of the carrier C. It will be noted that the passage 43 communicates with the reservoir at a point near the inner end of the reservoir and substantially adjacent the inner end of said sleeve bearing 31. Most of the lubricant is of course induced to flow radially outwardly to adequately lubricate the bearing surface. Some of the lubricant will seep inwardly along the sleeve bearing surface and thus the entire bearing surface is adequately lubricated at all times. The inclination of the spindles and the location of the communicating passage or port 42 cooperate to induce lubricant flow into the bearing under the influence of centrifugal forces.

It will be observed that the spindle 30 is provided with a cup-shaped flange 51 at the base or inner end of said spindle. The sleeve 31 fits on this cup-shaped flange and has a predetermined clearance with respect to the spindle and thus a predetermined quantity of lubricant is allowed to seep into the cupped recess formed by the flange 51. This flange 51 has an annular lip 52 and the lubricant in said cupped recess is caused to fly off this lip and is consequently directed to impinge directly onto the beveled gear 32 at the point of mesh with the ring gears, where lubrication is needed most. In fact the idler gears 32 are substantially drenched in oil while the engine is operating due to movement of the carrier C. The ring gears are lubricated at the points where they mesh with the idler gears. The above arrangement has resulted in the provision of a practical and successful reduction gear mechanism in which adequate lubrication is assured.

The gear case is preferably provided with a detent 53 positioned immediately above the stationary ring gear. The lubricating oil which is thrown off of the gearing tends to flow down the wall of the case and is collected on this detent and caused to drip directly on said stationary ring gear.

It will thus be noted that I have provided an efficient yet simple lubricating means especially suited to a reduction gear drive of the character described, and that the lubricating oil is caused to flow directly to the parts to be lubricated.

It will thus be observed that I have provided a construction which is compact and serviceable, and which employs a minimum of moving parts, so constructed and arranged as to be thoroughly lubricated at all times under various conditions of engine operation. My construction is readily assembled to an engine and may at any time be readily serviced if necessary with a minimum of cost. The drive is readily reversed and is thus adaptable for use with various types of engines.

Referring more particularly to Figs. 2 and 4 illustrating respectively the two positions of the gearing, it will be noted that the carrier C is turned end for end. The relationship of the shoulders 60 and 61 carried by the carrier C and arranged to abut the anti-friction bearings 35, with the center lines of the spindles and pitch axis of the ring gears is very important. The line $a$ extending along the pitch line of the gear teeth of ring gear 24 intersects a similar line $b$ extending along the pitch line of the gear teeth of ring gear 25 at a point P in Fig. 2 and $P_1$ in Fig. 4. The center line or axis $c$ of each of the idler gears 32 also intersects these lines $a$ and $b$ at point P in Fig. 2 and $P_1$ in Fig. 4 on the carrier axis. The axial distance between shoulders 60 and 61 is represented in Figs. 2 and 4 by the line ($d$ plus $e$), in which $d$ in both instances represents the axial distance from shoulder 61 to the intersection of lines $a$, $b$ and $c$ while $e$ in both instances represents the axial distance from shoulder 60 to the intersection of lines $a$, $b$ and $c$.

It will be noted that the distances $d$ and $e$ are the same in both Figs. 2 and 4. The above relationship must always hold true if the carrier C is to be allowed to be turned end for end as herein illustrated, and the shoulders 60 and 61 bear a fixed relation with respect to the fixed ring 21 and driving member 14 at either position, that is, shoulder 60 (Fig. 2) is axially spaced a distance $f$ from the center of gear 23 and shoulder 61 is spaced the same distance $f$ from gear 16. Thus on reversal of the carrier C as in Fig. 4, it will be noted that shoulder 60 is spaced a distance $f$ from gear 16 while shoulder 61 is spaced a like distance $f$ from gear 21.

Although I have illustrated but one form of my invention and disclosed but one adaptation thereof, it will be readily apparent that same may be embodied in other applications and modified as to construction without departing from the principles of my invention or from the spirit of the claims appended hereto.

I claim:

1. A reduction drive including driving and driven members, a pair of beveled ring gears of different pitch diameter, a fixed support, said ring gears each provided with means constructed for interlocking connection with the driving member or said fixed support, whereby to permit the selective mounting of either ring gear in driving relation with said driving member, a carrier drivingly connected with said driven member and carrying a plurality of spindles inclined to a plane extending normal to the carrier axis, and a plurality of beveled idler gears rotatably mounted on said spindles and meshing with said ring gears, said carrier adjustable end for end whereby to relatively adjust the position of said idler gears for driving engagement with a preselected positioning of said ring gears.

2. In a gear reduction drive, a fixed support, driving and driven members, a pair of axially aligned beveled ring gears each having a splined portion constructed and arranged for selective engagement with a complementary splined portion on either the driving member or said fixed support, a carrier drivingly connected with the driven member and carrying a plurality of spindles inclined alike with respect to a plane extending normal to the carrier axis, beveled idler gears rotatably mounted on said spindles, said driving connection between said carrier and driven member being constructed and arranged to permit said carrier to be selectively adjusted end for end for selectively positioning said idler gears in relation with respect to any preselected positioning of said ring gears.

3. In a gear reduction drive, a fixed support, driving and driven members, a pair of axially aligned beveled ring gears each having a splined portion constructed and arranged for selective engagement with a complementary splined portion on either the driving member or said fixed support, a carrier drivingly connected with the driven member and carrying a plurality of spindles inclined alike with respect to a plane extending normal to the carrier axes, beveled idler gears rotatably mounted on said spindles, said driving connection between said carrier and driven member being constructed and arranged to permit said carrier to be selectively adjusted end for end for selectively positioning said idler gears in relation with respect to any preselected positioning of said ring gears, and spaced axially aligned anti-friction bearing means carried by said carrier for supporting both said ring gears.

4. A unitary gear reduction drive comprising a carrier, axially aligned and spaced beveled ring gears of different pitch diameter rotatably supported on said carrier, a plurality of beveled idler gears rotatably supported on said carrier for meshing engagement with both said ring gears, driving and driven members, and a fixed support axially spaced from said driving member, said driving member and said fixed support having aligned splined portions, said ring gears having aligned splined portions constructed and arranged for connection with the splined portions on either the driving member or said fixed support, said carrier adjustably mounted end for end in driving relation on said driven member.

5. A reduction drive including driving and driven members, speed reducing means drivingly connecting said driving and driven members and comprising a planetary gear mechanism including a pair of axially spaced beveled ring gears, a carrier drivingly connected with one of said members and having axially spaced locating shoulders, bearing means abutting said shoulders and supporting said ring gears, said ring gears each constructed and arranged for selective driving engagement with the other of said members, intermediate beveled idler gears rotatably carried by said carrier in constant meshing engagement with both said beveled ring gears, the axis of said idler gears intersecting the axis of the carrier at a point coinciding with the apex of the cone surfaces represented containing the pitch lines of the beveled ring gears, which point is axially spaced from the shoulders on said carrier an amount exactly the same as when said carrier is reversed end for end.

6. In a reduction gear drive, driving and driven members, speed reducing means drivingly connecting said driving and driven members and comprising a planetary gear mechanism including a carrier drivingly connected with one of said members, said carrier comprising a one-piece integral structure having a hub portion provided with bearing means for supporting other elements of said gear mechanism, and a plurality of radially extending intermediate gear supporting spindles.

7. In a reduction gear drive, driving and driven members, speed reducing means drivingly connecting said driving and driven members and comprising a planetary gear mechanism including a fixed ring gear, a rotatably mounted ring gear axially spaced from said ring gear and drivingly connected with said driving member, a carrier drivingly connected with the driven member and comprising a one-piece integral structure having a hub portion provided with bearing means for supporting said ring gears, and a plurality of radially extending spindles, and intermediate gears rotatably mounted on said spindles in constant meshing engagement with said ring gears.

8. In a reduction gear drive, driving and driven members, speed reducing means drivingly connecting said driving and driven members and comprising a unitary planetary gear mechanism constructed and arranged for operative assembly with said driving and driven members as a unit subassembly, said unitary planetary gear mechanism including a carrier drivingly connected with one of said members and carrying bearing means supporting axially spaced other elements of said planetary gear mechanism.

9. In a reduction gear drive, driving and driven members, speed reducing means drivingly connecting said driving and driven members and comprising a unitary planetary gear mechanism constructed and arranged for operative assembly with said driving and driven members as a unit subassembly, said unitary planetary gear mechanism including a carrier drivingly connected with one of said members and comprising a one-piece integral structure having a hub portion and a plurality of radially extending spindles, said hub portion extending axially to both sides of said spindles, intermediate gears rotatably mounted on said spindles, and a ring gear mounted on each hub extension in constant mesh with said intermediate gears.

10. In a reduction gear drive, driving and driven members, speed reducing means drivingly connecting said driving and driven members and comprising a unitary planetary gear mechanism constructed and arranged for operative assembly with said driving and driven members as a unit subassembly, said unitary planetary gear mechanism including ring gears, a plurality of idler gears operatively connecting said ring gears, and a one piece integral carrier structure drivingly connected with one of said members and provided with a plurality of integral extensions for supporting said ring gears and said idler gears of the planetary gear mechanism.

11. In a reduction gear drive, driving and driven members, speed reducing means drivingly connecting said driving and driven members and comprising a unitary planetary gear mechanism constructed and arranged for operative assembly with said driving and driven members as a unit subassembly, said unitary planetary gear mechanism including a one piece integral carrier structure drivingly connected with one of said members and provided with a plurality of integral extensions for supporting the other moving elements of said planetary gear mechanism, and including a plurality of radially extending spindles inclined to a plane extending normal to the carrier axis.

12. In a reduction gear drive, driving and driven members, speed reducing means drivingly connecting said driving and driven members and comprising a unitary planetary gear mechanism constructed and arranged for operative assembly with said driving and driven members as a unit subassembly, said unitary planetary gear mechanism including a one piece integral carrier structure drivingly connected with one of said members and provided with a plurality of integral extensions for supporting the other moving elements of said planetary gear mechanism, and including a plurality of radially extending spindles inclined to a plane extending normal to the carrier axis, said other carrier extensions each having bearing means coaxially located relative to the said carrier axis.

JAMES W. KINNUCAN.